UNITED STATES PATENT OFFICE.

EMILE AUGUSTE LEOPOLDE ROUXEVILLE, OF PARIS, FRANCE.

PROCESS FOR THE AGGLOMERATION AND REGENERATION OF INDIA-RUBBER, GUTTA-PERCHA, AND THEIR ARTIFICIAL SUBSTITUTES.

No. 922,339.   Specification of Letters Patent.   Patented May 18, 1909.

Application filed March 18, 1907. Serial No. 363,053.

*To all whom it may concern:*

Be it known that I, EMILE AUGUSTE LEOPOLDE ROUXEVILLE, a citizen of the French Republic, and resident of Paris, France, have invented a certain new and useful Process for the Agglomeration and Regeneration of India-Rubber, Gutta-Percha, and their Artificial Substitutes, of which the following is a specification.

The present invention relates to the industrial application of the product obtained by the polymerization of oil of turpentine, of individual terpenes or of products containing terpenes. This application is particularly intended for the regeneration and agglomeration of gutta-percha and vulcanized india rubber as well as of artificial substitutes of these bodies.

In addition to the complex product obtained by the polymerization of oil of turpentine according to U. S. patent application No. 321297 June 11th, 1906, any of the individual hydrocarbons contained in this artificial product may be used for the purposes referred to above, such as cymene, oxidized or not, nitrated or not, terebene, diterebene, camphene, terpilene, colophene and all the derivatives of oil of turpentine boiling above 130°. Among the products which may be used instead of oil of turpentine in order to obtain a polymerized product of the kind to be described hereafter, the various kinds of resin may be used as well as coal tar.

I have ascertained that the polymerized product referred to, its constituents, as well as the polymerized products obtained from resin and fractions of coal tar containing terpenes, possess the following properties: A. They dissolve, when heated, vulcanized india rubber. B. They can be vulcanized *i. e.* they combine with sulfur. C. They have a stronger affinity for sulfur than natural india rubber and consequently they withdraw sulfur from vulcanized rubber when heated with the same. D. They can form a solution or an emulsion in water after having previously been treated with an alkali *i. e.* transformed into a salt or soap. E. They continue to dissolve, when heated, vulcanized india rubber when they have been previously treated with an alkali *i. e.* when they have formed a salt or soap. F. When they are viscid and plastic they constitute an artificial substitute for india rubber and gutta percha and for this reason they may remain mixed with the rubber or gutta percha.

All the properties enumerated above render the bodies indicated capable of regenerating or agglomerating old vulcanized rubber, gutta percha and their artificial substitutes.

In order to shorten the explanations to be given below, I shall merely apply the artificial product called polymerized product, referred to above, in the operations to be described. It will be readily understood however that this polymerized product may be replaced by any of the other polymerized products referred to.

In order to agglomerate old pieces of vulcanized rubber without removing from the rubber any of its artificial additions I proceed as follows, the proportions of each body depending on the quality of the waste rubber. I take for instance 100 gr. of waste rubber in the form of powder and 10 to 50 grams of the polymerized product, mix the two bodies and heat the mixture to 140° for about 1½ hours preferably in a mold and under pressure so as to secure a thorough mixing during the heating. A homogeneous substance will thus be obtained in which the rubber and the polymerized product can no longer be distinguished. This substance will behave like new rubber, that is it can be gummed to another piece of the same substance and can be vulcanized. The operation is the same if instead of waste rubber artificial substances of rubber are used. If it is desired to obtain by a single heating a homogeneous vulcanized mass, an adequate quantity of sulfur need merely be added to the mixture before the heating, or else a polymerized product may be used which has previously been vulcanized by means to be referred to hereafter. The presence of the polymerized product in the mixture after the heating is not prejudicial to the mixture, as this polymerized product forms an artificial substitute for rubber.

In order to regenerate vulcanized waste rubber *i. e.* in order to eliminate its sulfur and its artificial additions, I proceed as follows, using proportions that depend on the quality of the waste rubber. I take for instance 100 grams of waste rubber in the form of powder and 50–100 gr. of the polymerized product. I may mention beforehand that in this operation for regenerating waste vulcanized rubber the polymerized product will afterward be treated with an alkali so as to produce an emulsion. It will therefore be preferable to use a polymerized product which has been strongly polymerized, that is to say approaches the properties of resin. The polymerized product can even be replaced by common resin, provided the latter forms an emulsion when treated with an alkali, that is to say provided the resin used is able to form a soap. A resin soap might also of course be used.

The substances are mixed and heated as indicated above. After the heating the mixture is divided into small portions which are, if necessary, macerated in carbon bisulfid in order to make them swell up, although this is not indispensable. The portions are afterward heated in a concentrated solution of an alkali (sodium hydrate, potassium hydrate, ammonia) or of and alkaline salt (sodium carbonate, sodium sulfid etc.). The alkaline solution is then removed and the portions are treated repeatedly with boiling water, then with acidulated water and finally with pure water. Insead of treating with boiling water the portions may be treated in a digester at 140° C.

During these various operations the polymerized product will separate itself from the waste rubber by going into solution or forming an emulsion in water, but at the same time the waste rubber will owing to this emulsion be finely divided and the artificial additions in the waste rubber will fall to the bottom of the recipient.

The artificial substitutes and additions found to exist in the rubber, as well as the excess of the polymerized product may be eliminated by treating the mixture with sulfuric acid according to the old method used in the rubber industry.

In order to further refine the regenerated rubber it may be dissolved in a suitable solvent and afterward precipitated with acetone.

I may observe in this connection that a polymerized product which has previously been treated with an alkali can be used before the heating of the mixture, as the presence of alkali in the polymerized product does not prevent the latter from dissolving, when heated, waste india rubber. A resin soap could thus be used in this case.

A further method may be used for regenerating waste rubber which is based on the same principles. The old vulcanized rubber is dissolved by heating the same in oil of turpentine whereupon the mixture is treated with an acid or another polymerizing agent, as was set forth in my patent application No. 321297 of June 11th 1906. The polymerized product will form itself within the mixture and the process of regeneration will be continued in the manner referred to above.

As regards the vulcanization of the polymerized product, or of its viscid constituents, the following considerations have to be taken into account. Vulcanization with pure sulfur is not easily realized, as the products to be vulcanized become liquid before the melting point of the sulfur and the latter does not remain fixed with the product to be treated, so that it becomes necessary to agitate the mixture during the vulcanization. This vulcanization however is easier if certain compounds of sulfur are used, for instance chlorid of sulfur. The products can be treated directly with chlorid of sulfur or the following mode of operation may be adopted.

When the oil of turpentine has been polymerized with sulfuric acid and the polymerized product is formed as a black viscid mass, the acid is separated off by decanting. The black viscid mass is then treated with an even mixture of chlorid of sulfur and carbon bisulfid. The proportion of chlorid of sulfur will depend on the object aimed at and the degree of vulcanization desired. The washing and neutralization of the polymerized product is then effected, as indicated in the patent concerning the product.

If it is desired to obtain a polymerized product which is strongly vulcanized i. e. contains much sulfur, the oil of turpentine may be treated with chlorid of sulfur alone, diluted or not with carbon bisulfid as chlorid of sulfur has both a polymerizing and a vulcanizing effect.

All the observations set forth with regard to india rubber apply also to gutta percha, as the polymerized product and its constituents behave in the same way with regard to gutta percha.

Having now fully described my said invention what I claim and desire to secure by Letters Patent is:

1. Process for the regeneration of old india rubber, gutta percha and their artificial substitutes consisting of mixing the same with the products obtained by the polymerization of oil of turpentine, heating the mixture, treating the mixture with an alkali, in order to transform the polymerized product used into an emulsion, for the purpose of removing the same.

2. The described process of regenerating waste india-rubber, gutta percha and their artificial substitutes which consists in mixing the same with the polymerized products of oil of turpentine and then to an alkali and sulfuric acid.

3. Process for the agglomeration and regeneration of india rubber, gutta percha and their artificial substitutes consisting of mixing the same with the polymerized productions of oil of turpentine and finally treating with chlorid of sulfur for vulcanization.

4. The described process of regenerating waste india-rubber, gutta percha and their artificial substitutes, which consists in mixing the same with the products obtained by the polymerization of oil of turpentine, heating the mixture, treating the mixture with an alkali for its conversion into an emulsion, and then with sulfur.

5. The described process of regenerating waste india rubber, gutta percha, and their artificial substitutes, which consists in mixing the same with the products obtained by the polymerization of oil of turpentine, heating the mixture, converting the mixture into an emulsion and then treating the product with chlorid of sulfur.

In testimony whereof I have hereunto set my hand in presence of two witnesses.

EMILE AUGUSTE LEOPOLDE ROUXEVILLE.

Witnesses:
  DEAN B. MASON,
  JOHN BAKER.